United States Patent Office 3,287,277
Patented Nov. 22, 1966

3,287,277
LIQUID DETERGENT
John Henderson Barbour, 113 Poplar Ave.,
Raumati South, Wellington, New Zealand
No Drawing. Filed Feb. 20, 1964, Ser. No. 346,072
8 Claims. (Cl. 252—106)

This invention relates to liquid detergents and/or methods of manufacturing same.

At present when using liquid detergents currently on the market for the cleaning of, for example dairy machinery, there are some disadvantages in that the surface of the article being cleaned is not left in as good a condition as could be hoped for. Thus for example with some detergents at present supplied there may be pitting of surface metals and with others there may be spotting of the surface in that the evaporating mixture of water and detergent leaves a patchy deposit on the surface.

It is therefore an object of the present invention to provide a liquid detergent and/or a method of manufacturing a liquid detergent which resultant liquid detergent will obviate or minimise the foregoing disadvantages.

Accordingly in one aspect the invention consists in a liquid detergent composition comprising as major constituent a substantially fat-free liquid milk product as herein defined, and as minor constituent a bactericide, an alkaline substance and a surface active agent, the proportions being such that a satisfactory liquid detergent composition results.

In a further aspect the invention consists in a method of manufacturing a liquid detergent composition according to the preceding paragraph, said method comprising the steps of providing a volume of a substantially fat-free liquid milk product as herein defined, the volume being such as to form a base or major constituent of the detergent composition and adding to it as minor constituents a bactericide, an alkaline substance and a surface active agent in proportions such as to provide a suitable liquid detergent composition.

The major constituent of the liquid detergent composition of the present invention is the substantially fat-free liquid milk product which is defined as a substantially fat free derivative of milk having at least one of the normal constituents of milk in aqueous solution. By the term "substantially fat free" is meant that the liquid milk product has a fat content of approximately 2.5% by weight or less. Buttermilk obtainable as a by-product from the manufacture of butter from cream represents about the highest content of fat with which a satisfactory liquid detergent may be obtained according to the present invention. Preferably, however, the fat content is less than 2.5% by weight and approaches or is at the minimum practicable fat content.

Suitable sources of such liquid milk products include the by-products from cheese, casein, butter, or cream manufacture, namely rennet whey, lactic acid casein whey, buttermilk, and skim milk, together with the powders of any one or more of these which have been reconstituted by the addition of water thereto.

The batericide used in the formulation of the liquid detergent is preferably formalin or a compatible one of the known detergent bactericides such as those sold under the names of Nipagins, Nipasols, Foromycins, and the like. Nipagin is a trade name for methyl p-hydroxybenzoate, Nipasol is a trade name for propyl p-hydroxy benzoate and Foromycin is an alternative name for formicin which is formaldehyde acetamide. The purpose of the bactericide is to inhibit bacterial growth in the solution after blending and is an essential constituent in view of the major constituent of the detergent composition being a liquid milk product. While the amount of bactericide necessary depends to a certain extent upon the nature of the particular liquid milk product it has been found that up to about 2% by volume of a 30% formaldehyde solution is generally effective.

The alkaline substance used in the formulation of the liquid detergent may be any alkaline substance compatible with the liquid milk product, for example sodium hydroxide and sodium carbonate, but preferably sodium tripolyphosphate. The other sodium phosphates, for example disodium phosphate can be used but tend to cause cloudiness and even emulsification to a white paste. The alkaline substance is used not only to neutralise the acid in the liquid milk product but also to neutralise any acid in the surface active agent. As in known detergents, a sufficient quantity of alkaline substance is incorporated to make the composition substantially neutral for example to a pH between 6 and 7.5 and preferably to a pH of 6.75–6.8. Where the alkaline substance used is sodium tripolyphosphate, a slight excess may be added to assist in the detergency.

The surface active agent used in the formulation of the detergent is preferably a sulphonic acid derived surface active agent. The alkyl aryl sulphonic acids and alkali metal salts thereof are particularly efficacious, especially if derived from sources other than the sulphonation of petroleum oils. The preferred surface active agent used in the examples given below is sodium dodecyl benzene sulphonate of the tetrapropylene branch chain type. Particularly suitable concentrations of sodium dodecyl benzene sulphonate are from 15% to 20% by volume of the detergent composition but this will vary with the nature of the liquid milk product being used.

In addition to the above constituents, the liquid detergent composition may include inorganic salts adapted to act as thickening agents to increase the viscosity and tend to turn the liquid into a cream. They may also tend to assist lathering. Preferred salts are sodium chloride and sodium sulphate separately or together in total amounts up to about 10% by volume.

Where desirable for consumer appeal, a compatible perfume may be incorporated into the detergent composition. Any such perfume should preferably be a non-alcoholic perfume, since the presence of alcohol would cloud the detergent. Expensive perfumes may be used subject to their cost limitations, but the preferred perfume used in the examples below is compound 3138 sold by Bush and Co. of Auckland, New Zealand.

It will be apparent that other materials known in the formulation of detergents may also be incorporated into the liquid detergent composition of the present invention provided they are compatible therewith. For example foam stabilisers and other detergent additives, such as builders, could be added, but are generally found unnecessary. So far as foam stabilisers are concerned, it seems that it is a property of the liquid milk product to act as a foam stabiliser.

In the general process for preparing the liquid detergent composition of the present invention, a large volume of the liquid milk product is placed in a vat or similar vessel to form the major constituent or base of the composition. When the liquid milk product is derived by reconstitution of a milk powder with water, the powder is reconstituted to a specific gravity, preferably of about 2.5 Twaddell.

While subjecting the liquid milk product to agitation such as by stirring, the bactericide is added first and then the alkaline substance and surface active agent are added in optional order, followed by the additional ingredients such as inorganic salts and perfumes.

The resulting composition may have a specific gravity as high as 8 Twaddell and is diluted with water to the consistency required for the specific intended use for the detergent composition. For example, most detergents are sold on the market at a specific gravity of about 4 Twaddell and the detergent compositions of the present invention may be diluted to that specific gravity with water.

It is preferred to allow the liquid to stand for several hours, for example overnight or up to approximately twenty-four hours, before breaking it down with water since there seems to be some reaction which occurs during that period. Such standing also enables the escape of captive air held in the mixture resulting from the agitation during its preparation.

The resultant liquid detergent composition has been found suitable for both general domestic and commercial use such as for instance in the washing of dishes and of dairy machinery. It has also been found to be stable to alkalies and to have both a lower surface tension and a lower lime soap dispersion number than many commercial detergents currently on the market in New Zealand. Both these latter results indicate a greater effectiveness as a detergent with respect to wetting action and to dispersing power respectively.

The invention will now be more particularly described by means of the following illustrative and non-limitative examples, wherein the ingredients are set out according to volume.

*Example I*

A general preparation of a detergent from milk powders or lactic acid casein whey.

Into a vessel is placed a water reconstituted fat-reduced milk powder, for example skim milk or buttermilk powder or lactic acid casein whey, to which 0.2 to 0.5% of a bactericide, for example formalin, is added while stirring is continued for a substantial period of time, for example thirty minutes. At the end of this period, 16% of a 95% active sodium dodecyl benzene sulphonate of the tetrapropylene type is added during continued high-speed circulation of the liquid. The temperature is raised to between 55° and 70° C., preferably 60° C., and held there for a substantial period of time, for example thirty minutes. An alkaline substance, for example sodium tripolyphosphate, which has been dissolved in several, for example 4 to 5, times its own weight of water is added slowly with continued stirring. At this point a rise in temperature will occur when neutralisation takes place. When all the ingredients are added the pH is checked and adjusted to between 6 and 7 with small additions of either acids or alkaline substances as required.

The resultant liquid composition in the vessel is now subjected to high speed agitation for fifteen minutes during which time air is absorbed. To eliminate this air, the detergent is allowed to stand overnight when same will clear. The specific gravity of the liquid detergent is then tested and brought to the desired value by dilution with water.

*Example II*

An alternative preparation of detergent from the whey which is a by-product of cheese manufacture.

| | Percent |
|---|---|
| Whey | 75 |
| Formalin (30% solution) | 2 |
| Sodium tripolyphosphate (anhydrous) | 2 |
| Sodium dodecyl benzene sulphonate | 15 |
| Sodium chloride | [1] 1 |
| Sodium sulphate | [1] 5 |

[1] Or 6% of either.

The whey is placed in the vat, agitation commenced and the formalin added. During this agitation the temperature rises to about 80° F., and then the sodium tripolyphosphate is added. Then with continuing forceful agitation the sulphonate is added to the liquid together with the sodium chloride and/or sodium sulphate. The thorough agitation plus the chemical reaction of the ingredients results in a mixture temperature of about 100° F.

The detergent is preferably allowed to remain standing for several hours during which any captive air held in the mixture will be freed.

A perfume may be added and the liquid detergent is run off into containers.

*Example III*

| | Percent |
|---|---|
| Lactic acid casein whey | 57½ |
| Formalin (30% solution) | 2 |
| Sodium tripolyphosphate (anhydrous) | 2 |
| Sodium dodecyl benzene sulphonate | 15 |
| Sodium sulphate | 5 |
| Sodium chloride | 1 |
| Water | 17½ |

The whey is placed in a vat and agitation commenced. First the formalin is added and then in turn the other listed ingredients are added. The resultant mixture is preferably left until the day following mixing, a perfume is then added, and the completed detergent is run off into containers.

The following examples illustrate various formulations utilising various liquid milk products. Only the ingredients are stated, the general preparative procedures following any one of those illustrated in Examples I–III, and the ingredients being incorporated in the order shown.

*Example IV*

Detergent using buttermilk:

| | |
|---|---|
| Buttermilk | gallons 8 |
| Formalin | oz 4 |
| Sodium tripolyphosphate | oz 4 |
| Sodium dodecyl benzene sulphonate | qts 8 |
| Perfume essence | oz 2 |

*Example V*

Detergent using rennet whey powder:

| | Oz. |
|---|---|
| Rennet whey powder reconstituted with water to 2.5 Twaddell | 53 |
| Formalin | 2 |
| Sodium tripolyphosphate | 2 |
| Sodium dodecyl benzene sulphonate | 7½ |
| Perfume | ½ |

*Example VI*

Detergent using lactic acid casein whey powder:

| | Oz. |
|---|---|
| Lactic acid casein whey powder reconstituted with water to 2.5 Twaddell | 212 |
| Formalin | 8 |
| Sodium tripolyphosphate | 8 |
| Sodium dodecyl benzene sulphonate | 28 |
| Perfume | 2 |

It will be apparent that the proportions of the ingredients may vary according to the resulting specific gravity required, the foaming capacity when in use as a detergent, and the like. A most important factor will however be the nature of the liquid milk product being used as the major constituent of the detergent.

For example, it has been found that the liquid milk products available as liquids from the suitable source are of higher acidity than those liquid milk products prepared by the reconstitution with water of milk powders derived also from those sources. Thus the non-reconstituted liquid milk products require a greater amount of alkaline substance and also a greater amount of bactericide than do the reconstituted liquid milk products. The milk powders also tend to be slightly more stable than the liquid milk products.

It has also been found that when the liquid milk product is a buttermilk a greater amount of surface active agent is required than in the other cases. This is due to the higher fat content in the buttermilk.

What I claim is:

1. A liquid detergent composition consisting essentially of a liquid milk product having a fat content of not more than approximately 2.5% by weight and selected from the group consisting of rennet whey, lactic acid casein whey, buttermilk, skim milk, reconstituted rennet whey, reconstituted lactic acid casein whey, reconstituted buttermilk and reconstituted skim milk, and having incorporated in said liquid milk product up to about 2% by volume of a bactericide selected from the group consisting of methyl p-hydroxy benzoate, propyl p-hydroxy benzoate, formaldehyde acetamide and formalin, about 15% to 20% by volume of a surface active agent selected from the group consisting of alkyl benzene sulphonic acids and alkali metal salts thereof; and an alkaline substance compatible with said liquid milk product and present in sufficient quantity to adjust the pH of the detergent composition to between 6.0 and 7.5.

2. A liquid detergent composition as claimed in claim 1 wherein said liquid milk product is a reconstituted product having a specific gravity of 2.5 Twaddell.

3. A liquid detergent composition as claimed in claim 1 wherein said bactericide comprises formalin.

4. A liquid detergent composition as claimed in claim 1 wherein said alkaline substance comprises sodium tripolyphosphate.

5. A liquid detergent composition as claimed in claim 1 wherein said surface active agent comprises sodium dodecyl benzene sulphonate.

6. A liquid detergent composition as claimed in claim 1 wherein up to 10% by volume of an inorganic additive selected from the group consisting of sodium chloride, sodium sulphate, and mixtures of sodium chloride and sodium sulphate is also included in the composition, said amount being sufficient to increase the viscosity and texture of the detergent composition.

7. A liquid detergent composition as claimed in claim 1 wherein the composition includes water added thereto in an amount sufficient to adjust the specific gravity to about 4 Twaddell.

8. A liquid detergent composition consisting essentially of a liquid milk product having a fat content of not more than approximately 2.5% by weight and selected from the group consisting of rennet whey, lactic acid casein whey, buttermilk, skim milk, reconstituted rennet whey, reconstituted lactic acid casein whey, reconstituted buttermilk and reconstituted skim milk, and having incorporated in said liquid milk product up to about 2% by volume of formalin; about 15% to 20% by volume of sodium dodecyl benzene sulphonate; up to about 10% bp volume of an inorganic additive selected from the group consisting of sodium chloride, sodium sulphate and mixtures of sodium chloride and sodium sulphate; and a sufficient quantity of sodium tripolyphosphate to adjust the pH of the detergent composition to between 6.0 and 7.5.

References Cited by the Examiner

FOREIGN PATENTS

| | | |
|---|---|---|
| 159,083 | 2/1921 | Great Britain. |
| 680,913 | 10/1952 | Great Britain. |
| 848,306 | 9/1960 | Great Britain. |

OTHER REFERENCES

"Washing, Cleaning and Polishing Materials," National Bureau of Standards Circular C424, Smithers, Government Printing Office, D.C., (1939), p. 12.

SAMUEL H. BLECH, *Primary Examiner.*

JULIUS GREENWALD, ALBERT T. MEYERS,
*Examiners.*

S. E. DARDEN, *Assistant Examiner.*